United States Patent
Mayers et al.

(10) Patent No.: US 6,678,379 B1
(45) Date of Patent: Jan. 13, 2004

(54) QUANTUM KEY DISTRIBUTION METHOD AND APPARATUS

(75) Inventors: Dominic Mayers, Plainsboro, NJ (US); Yoshie Kohno, Tokyo (JP); Yoshihiro Nambu, Tokyo (JP); Akihisa Tomita, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/336,078

(22) Filed: Jun. 18, 1999

(51) Int. Cl.$^7$ ................................................ H04L 9/08
(52) U.S. Cl. ...................... 380/278; 380/279; 380/277; 380/44; 380/256; 713/171
(58) Field of Search ................................ 380/278, 277, 380/279, 268, 263, 286, 256

(56) References Cited

U.S. PATENT DOCUMENTS

| | | | | |
|---|---|---|---|---|
| 5,307,410 A | * | 4/1994 | Bennett | 380/256 |
| 5,515,438 A | * | 5/1996 | Bennett et al. | 380/278 |
| 5,675,648 A | * | 10/1997 | Townsend | 380/278 |
| 5,732,139 A | * | 3/1998 | Lo et al. | 380/28 |

OTHER PUBLICATIONS

Hughes et al ; Quantum Cryptography 1995; Los Almos National Laboratory; pp. 9–35 and fig.3, 7 and 8.*
D. Mayers, Advances in Cryptology, Proceedings of Crypto '96, Lecture Notes in Comp. Sci., vol. 1109, (Springer–Verlag, 1996), p. 343–357, and D. Mayers. Los Alamos preprint archive quant–ph/9802025.

C.H. Bennett and G. Brassard, Proceedings of IEEE International Conference on Computers, Systems and Signal Processing, Bangalore, India (IEEE, New York, 1984), p. 175.

D. Mayers and A. Yao, in Proceedings of the 39th Annual Symposium on Foundations of Computer Science, p. 503 (1998).

* cited by examiner

*Primary Examiner*—Gilberto Barrón
*Assistant Examiner*—Kambiz Zand
(74) *Attorney, Agent, or Firm*—Scully, Scott, Murphy & Presser

(57) ABSTRACT

A method for testing the reliability of a quantum key distribution apparatus is provided. The method includes the steps of: producing a set of quanta by the sender, the set of quanta comprising first, second, and third quantum, the first, second, and third quantum having a quantum correlation; measuring the first and second quantum at a sender using one of two prearranged bases; transmitting the third quantum to the receiver over the quantum channel; measuring the third quantum at a receiver using one of the two prearranged bases; and exchanging information regarding the measured bases between the sender and receiver over a public channel to check for a known behavior of the quantum apparatus based upon the quantum correlation, wherein if the quantum apparatus behaves as is known or within a tolerable limit the reliability of the quantum apparatus is confirmed. A similar method for quantum key distribution is also disclosed.

20 Claims, 3 Drawing Sheets

QUANTUM KEY DISTRIBUTION METHOD AND APPARATUS

BACKGROUND OF THE INVENTION

1. Field of the Invention

The present invention relates generally to quantum cryptography techniques and, more particularly, to a method for testing the security of a quantum cryptographic system used for quantum key distribution.

2. Prior Art

Current cryptography techniques can be broadly divided into "computationally secure" and "unconditionally secure" varieties. Computationally secure cryptography is theoretically breakable, but is difficult to break in practice due to the huge amount of time that would be required with existing computer capabilities. On the other hand, unconditionally secure cryptography is impossible to break no matter how much computer power is available, and the existence of unconditionally secure cryptography is proved by Shannon's information theory.

A typical form of unconditionally secure cryptography is Vernam cryptography, which is implemented by the following procedure. A cryptographic key, which is a random sequence of n bits $\{0,1\}^n$, is shared between the sending and receiving parties. This key is used only once, and is then discarded (one-time pad method). The sending party converts the plaintext to be conveyed to the receiving party by cryptographic communication into a binary number (consisting of n bits). The cryptographic text (n bits) is obtained as the exclusive-OR (bitwise parity) of the plaintext with the cryptographic key. The resulting cryptographic text is sent to the receiving party. The receiving party obtains the bitwise exclusive-OR of the received cryptographic text with the key. The result is the plaintext expressed as a binary number.

Since a random sequence of data with absolutely no regularity is used as the key, it is essentially impossible to break the cryptographic text without obtaining the key itself, and since the key is only used once before being discarded, it is impossible to gain any information from the cryptographic text.

The quantum key distribution method is currently the only known method whereby shared keys necessary for the implementation of unconditionally secure cryptography in this way can be produced securely between sending and receiving parties at remote locations. The unconditional security of this key distribution method has been proven based on the uncertainty principle of quantum mechanics, which states that any eavesdropping activities made by an eavesdropper will always leave some form of trace in a quantum-level signal.

Quantum key distribution methods that have hereto before been proposed include four-state protocol (commonly referred to as the "BB84" protocol), two-particle interference protocol, non-orthogonal two-state protocol, and orthogonal two-state protocol. The BB84 protocol is summarized below. For a detailed description, see C. H. Bennett and G. Brassard, *Proceedings of IEEE International Conference on Computers, Systems and Signal Processing*, Bangalore, India (IEEE, New York, 1984), p. 175.

FIG. 2 illustrates an overview of an apparatus for BB84 protocol, referred to generally by reference numeral 300. Sending party 301, traditionally referred to as "Alice", can produce individual photons with controlled polarization states by operating a transmitter 303 consisting of a single-photon source and a polarization modulator. The individual photons carrying this polarization information constitute carriers for the smallest units of information (quantum bits). Individual photons that have exited from transmitter 303 pass through a quantum channel 305 and arrive at a receiving party 302, traditionally referred to as "Bob". Quantum channel 305 might consist of a propagation mode in an optical fiber or in free space. Receiving party 302 measures the state of the individual incoming photons by operating a measuring device 304, which has a controllable measurement basis. This measuring device can be configured from a polarizer and a photon detector, and its measurement basis can be switched by combining it with an electro-optical polarization rotating element such as a Pockels cell. A classical public channel 306 is used when collating the transmitted and received results to test for an eavesdropper 308, traditionally referred to as "Eve". Classical public channel 306 might be a radio or telephone link, and although there is no way of telling if it is subjected to eavesdropping, it is assumed that the content of this channel is not falsified.

A description of the BB84 protocol and its basic principles will now be discussed with reference to FIG. 3. A single bit of information, either a logical 0 or a logical 1, is transmitted by using the polarization state of a single photon. A coding method is prearranged between sending party 301 and receiving party 302, an example of which is as follows.

Two types of bases 400, 402 are used: the set $\{|0>+,|1>+\}$ of linear polarization along horizontal and vertical polarization axes (referred to hereinafter as the plus (+) basis), and the set $\{|0>x,|1>x\}$ of linear polarization along polarization axes inclined at ±45° to the horizontal axis (referred to hereinafter as the cross (x) basis). The states $|0>+$ and $|0>x$ are used to represent a logical 0, and the states $|1>+$ and $|1>x$ are used to represent a logical 1. Since four quantum states $\{|0>+,|1>+,|0>x,|1>x\}$ of individual photons are used in this way, it is referred to as a four-state protocol.

A measuring device that can discriminate between photons in the $|0>+$ and $|1>+$ states without errors is called a plus basis measuring device. A plus basis measuring device is completely unable to discriminate between the $|0>x$ and $|1>x$ states, and thus produces logical 0 and logical 1 data at random for each state. On the other hand, a measuring device that can discriminate between photons in the $|0>x$ and $|1>x$ states without errors is called a cross basis measuring device. A cross basis measuring device is completely unable to discriminate between the $|0>+$ and $|1>+$ states, and thus produces logical 0 and logical 1 data at random for each state. It is not possible to use these measuring devices to determine which of these four states $\{0>+,|1>+,|0>x,|1>x\}$ a photon of unknown state is in (according to the uncertainty principle).

The effect of eavesdropping will now be discussed with reference to FIG. 4. One way in which eavesdropping might occur in this process is as follows. An eavesdropper 308 accesses quantum channel 305 and measures the polarization state of a photon. If the eavesdropper has selected a measuring device capable of distinguishing the polarization state (probability ½), the eavesdropper can either perform a non-demolition quantum measurement (cloning), or retransmit a photon with exactly the same quantum state after performing a demolition measurement, and can thereby reliably ascertain the bit value without raising any suspicion. But when the eavesdropper has selected a measuring device that is unable to distinguish between the polarization states (probability ½), the polarization state of the photon is disturbed. When receiving party 302 measures the disturbed photon with a measuring device capable of distinguishing the polarization state before disturbance, the probability of obtaining the same bit value as the sending party is only ½. Accordingly, the probability of eavesdropping activities escaping detection for one bit is $1-(½)(½)=¾$. If s is the number of test bits, the probability that none of the s bit values is made inconsistent despite the eavesdropping activities is $(¾)^s$, and if s is given a large value, the value of $(¾)^s$ rapidly approaches zero. Accordingly, if this eavesdropping test is passed, it can be concluded with a probability sufficiently close to 1 that there is no eavesdropper.

Quantum bit transmission and reception protocol will now be explained. For each bit, sending party 301 randomly selects one of the four polarization states $\{|0>+,|1>+,|0>x, |1>x\}$ and transmits it to the receiving party 302. This is repeated n times. Receiving party 302 measures the polarization states by randomly selecting one of the two measuring devices (the plus basis or cross basis measuring device) for each bit, and sequentially stores the measurement bases and results. When the receiving party has chosen a measuring device capable of reliably discriminating the polarization state of a photon, the bit value detected by receiving party 302 should always match the bit value sent by the sending party 301. When a measuring device that is incapable of discriminating the polarization state is selected, the bit values of the sending party 301 and receiving party 302 will differ with a probability of ½.

Sending party 301 and receiving party 302 use a classical public channel 306 to collate the bases used for each bit without saying whether the measurement results were 1 or 0. This leaves approximately half the bits for which sending party 301 and receiving party 302 used the same bases; bits for which different bases were used are discarded. If there is no eavesdropper 308 and the channel is noiseless, the two resulting series of random numbers should match perfectly.

Sending party 301 and receiving party 302 extract test bits at random from the resulting random number series and check the two bit values against each other for each bit to check that they match. This test is performed for a sufficient number of bits, and if all the bit values match it can be concluded with a probability close to 1 that there is no eavesdropper 308 for the reasons stated above. If it is concluded that there is no eavesdropper 308, the test bits are discarded and the remaining random number series are used as a shared key. But if just one inconsistent bit is detected, it is concluded that an eavesdropper 308 is present and the current communication session is invalidated. Should this situation arise, the session is restarted from scratch after measures have been taken such as checking the quantum channel or switching to another quantum channel 305a.

The above process allows the sending and receiving parties 301, 302 to obtain a shared key while confirming that there is no eavesdropper 308 resulting in a secure communication. However, as described in detail below, it is impossible to guarantee the secure key distribution with the prior art BB84 protocol since there is no way in which the reliability of the quantum cryptographic apparatus 300 can be confirmed.

Earlier research has produced the following findings regarding the security of quantum key distribution methods and the reliability of apparatus used to conduct such methods.

First, the security of methods other than BB84 protocol will be discussed. As for non-orthogonal two-state protocol and orthogonal two-state protocol, mathematical proofs have not existed until those of the present invention that they are unconditionally secure against all attacks by an eavesdropper 308 of unlimited ability, even if a perfect apparatus 300 is used. They are considered to offer worse security than BB84 protocol offers.

Two-particle interference protocol can only be guaranteed unconditionally secure against all attacks by an eavesdropper 308 of unlimited ability if the assumption that the apparatus 300 is perfect is satisfied. However, its security cannot be guaranteed if the apparatus is imperfect, and it has been shown that dangerous situations may arise in which eavesdroppers 308 cannot be detected.

The Security of BB84 encryption will now be discussed. Since the four states used in the BB84 protocol are highly symmetrical, research into the mathematical proof of its security is highly advanced (the most advanced for all protocols proposed so far).

The following result is already known: If transmitter 303 is perfect, i.e. if single photons having closely regulated polarization states can be reliably produced 100% of the time, then BB84 protocol is unconditionally secure even if quantum channel 305 and/or measuring device 304 have error rates within a certain range of tolerance. A detailed proof of this proposition can be found in D. Mayers, *Advances in Cryptology, Proceedings of Crypto* 0796, Lecture Notes in Comp. Sci., Vol. 1109, (Springer-Verlag, 1996), p. 343–357, and D. Mayers, *Los Alamos preprint archive quant-ph*/9802025. Those skilled in the art will appreciate that the strict condition that transmitter 303 is perfect is still imposed here.

Research is also currently under way into proving the proposition, which is expected to be proven correct, that the BB84 protocol is unconditionally secure as long as errors occurring in the entire quantum apparatus 300 including transmitter 303 are tolerable ones.

Note that two approaches can be used to accept that an apparatus has a required security property. The first approach relies on the general confidence we have in a given technology and on the expertise of physicists. The second approach relies on a cryptographic test (typically) executed on each execution of the protocol.

In the first approach, the property must be stated as an assumption. It is not proven. Note that the assumption might require the execution of some regular verifications. For example, an assumption that the error rate is below 2 percent might require that Alice and Bob are not too far away. This kind of verification belongs to the first approach because it does not remove the assumption. We still have to rely on our general confidence in a technology or in the expertise of physicists. This approach is fine to establish as a physical law that privacy is possible, but it is not acceptable for a cryptographic purpose. The problem is that in a particular execution, the apparatus might be defective, or perhaps the manufacturer was not careful, and the assumption might turn out to be wrong.

The second approach uses a test together with some basic assumptions (which are not proven) and it actually proves the desired property (under the stated assumptions). For example, a test on the error rate can be used to prove that the error rate is below some given level, for instance, 2 percent. In this case, one required assumption is that the tested positions are chosen uniformly at random. The advantage is that the required assumptions are usually easier to verify and accept without a proof than is the desired property itself. This second approach is much more secure and is the one typically used to bound the error rate from above. In this approach, one does not rely on the expertise of physicists to conclude that the error rate is bounded from above.

The present invention supports the second approach but does more than bound the error rate from above. Only an upper bound on the error rate does not guarantee privacy if the quantum apparatus is defective. The test associated with the invention proves the complete security of the apparatus.

If the security property of the apparatus is not proven, it has been pointed out that there may be cases where there is a danger that eavesdroppers 308 may go completely undetected. An example of this is illustrated in FIG. 5. It is assumed that a perfect single-photon source 303 always emits just one photon each time, but in the event that a defective source 303a which emits two or more photons $\hbar\omega_e$, $\hbar\omega_b$ is used, an eavesdropper 308 can obtain almost all of the information (e.g. by using a beam splitter 600 to steal some of the plurality of photons $\hbar\omega_e$) without any of his activities being detected, which is clearly dangerous. Many other examples having potentially dangerous results such as this are also conceivable as recognized by those skilled in the art.

The details of research into the security of quantum key distribution methods and the reliability of apparatus as discussed above clearly demonstrate that to establish a key with guaranteed security, it is first essential to evaluate the reliability of the overall quantum apparatus 300 consisting of transmitter 303, quantum channel 305 and measuring device 304 (plus a reliability checking apparatus, if required).

However, no methods have heretobefore been devised for checking the reliability of the complete set of quantum cryptographic apparatus under comprehensive conditions.

SUMMARY OF THE INVENTION

Therefore it is an object of the present invention to provide a method and apparatus which is able to check the reliability of a quantum cryptographic apparatus.

It is a further object of the present invention to provide a method and apparatus which is able to confirm the security of the quantum key distribution.

The present invention provides a technique for quantum key distribution wherein three quanta having a quantum correlation are used as carriers of key information. In a preferred implementation of the present invention, the state of the three quanta having a quantum correlation is a Greenberger-Horne-Zeilinger (GHZ) state represented as $(|0\rangle|0\rangle|0\rangle+|1\rangle|1\rangle|1\rangle)/\sqrt{2}$, or $(|0\rangle|0\rangle|0\rangle-|1\rangle|1\rangle|1\rangle)/\sqrt{2}$ in a certain two-dimensional orthonormal basis B={$|0\rangle,|1\rangle$}. Preferably, the technique of the present invention is such that the sending party produces three quanta having a quantum correlation represented by a GHZ state in a certain two-dimensional orthonormal basis B={$|0\rangle,|1\rangle$}, the states of two of these three quanta are measured by the sending party, and the other one is transmitted to the receiving party and its state is measured by the receiving party, and wherein each quantum state measurement is made using either of the following two types of basis: A two-dimensional orthonormal basis Bb={$|0\rangle b,|1\rangle b$}, where:

$|0\rangle b=(|0\rangle+|1\rangle)/\sqrt{2}$ $|1\rangle b=-i(|0\rangle-|1\rangle)/\sqrt{2}$ A two-dimensional orthonormal basis Bc={$|0\rangle c,|1\rangle c$}, where:

$|0\rangle c=\{(1-i)|0\rangle+(1+i)|1\rangle\}/\sqrt{2}$ $|1\rangle c=\{(1+i)|0\rangle+(1-i)|1\rangle\}/\sqrt{2}$ and wherein, after this procedure has been repeated a plurality of times, the parities of the measurement results are collated by an exchange of information between the sending and receiving parties over a public channel, thereby checking for eavesdroppers and testing the reliability of the apparatus. Preferably, the technique as mentioned above uses photons or electrons or atoms as carriers for the key information. Alternatively, the technique as mentioned above uses a two-dimensional Hilbert space of photon polarization states or electron spin states or nuclear spin states as the signaling space for key information.

Consequently, the methods of the present invention are able to solve the problem of being unable to confirm the security of quantum key distribution. Specifically, the technique of the present invention allows the security of key distribution to be guaranteed because it can confirm the reliability of the quantum apparatus as well as the presence or absence of eavesdropping.

Accordingly, the present invention is directed to a method for testing the reliability of a quantum key distribution apparatus. The method comprises the steps of: producing a set of quanta by a sender, the set of quanta comprising first, second, and third quanta, the first, second, and third quanta having a quantum correlation; measuring the first and second quantum at the sender using one of two prearranged bases; transmitting the third quanta to a receiver over the quantum channel; measuring the third quanta at the receiver using one of the two prearranged bases; and exchanging information regarding the measured bases between the sender and receiver over a public channel to check for a known behavior of the quantum apparatus based upon the quantum correlation, wherein if the quantum apparatus behaves as is known or within a tolerable limit the reliability of the quantum apparatus is confirmed.

Also provided is a method for quantum key distribution. The method comprises the steps of: producing a set of quanta by the sender, the set of quanta comprising first, second, and third quanta for use as carriers of key information, the first, second, and third quanta having a quantum correlation; measuring the first and second quantum at the sender using a randomly selected basis from a group consisting of two bases; transmitting the third quanta to the receiver over the quantum channel; measuring the third quanta at the receiver using a randomly selected basis from a group consisting of the two bases; exchanging information regarding the measured bases between the sender and receiver over a public channel to check for a known behavior of the quantum apparatus based upon the quantum correlation; and reiterating the above steps a plurality of times thereby sharing the key as a string of bits wherein each bit of the string is distributed for each iteration where the quantum apparatus behaves as is known or within a tolerable limit, and where the bit value is determined according to a predetermined criteria based upon the randomly selected basis chosen for the first, second, and third quantum and the measurement thereof.

Apparatus for carrying out the methods of the present invention are also provided.

BRIEF DESCRIPTION OF THE DRAWINGS

These and other features, aspects, and advantages of the methods and apparatus of the present invention will become better understood with regard to the following description, appended claims, and accompanying drawings where:

DETAILED DESCRIPTION OF THE PREFERRED EMBODIMENT

Figure 1:
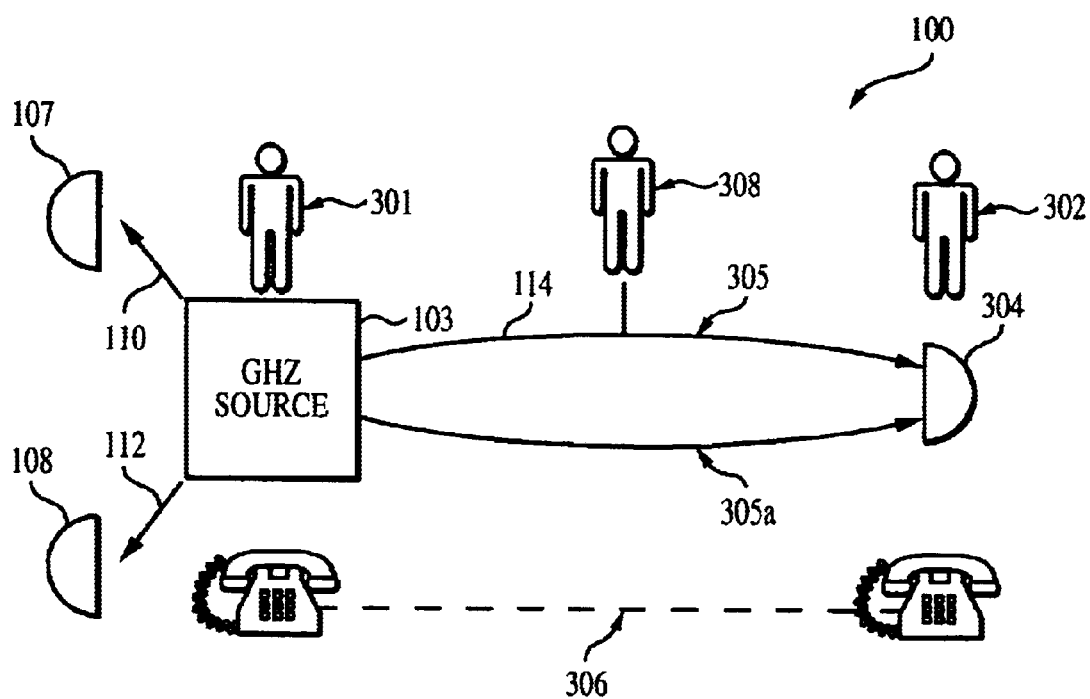
FIG. 1 illustrates an embodiment of a quantum key distribution apparatus using a GHZ source as proposed by the present invention.
Figure 2:
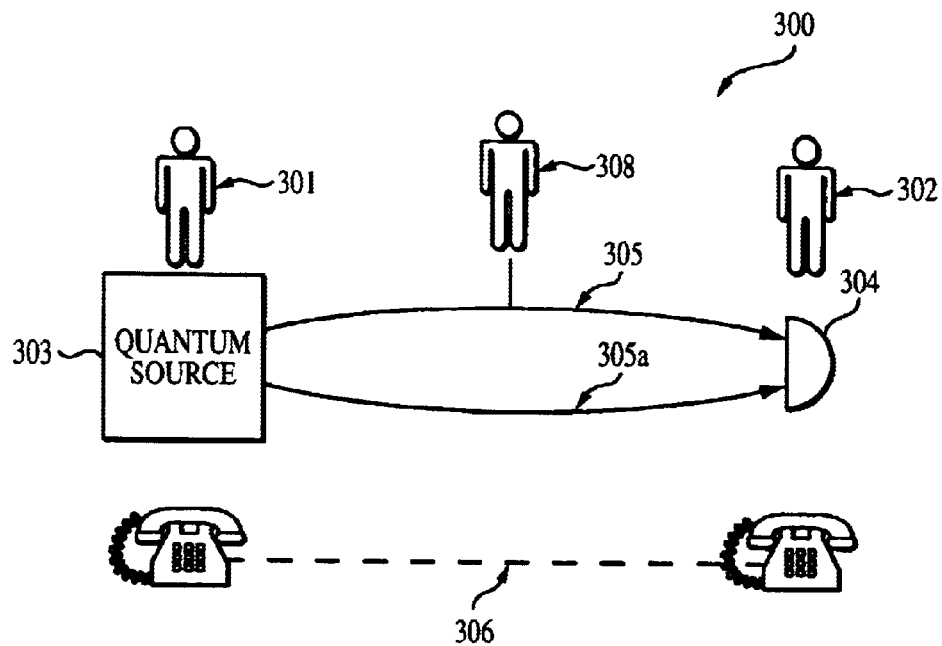
FIG. 2 illustrates a conventional BB84 quantum key distribution apparatus of the prior art.
Figure 3:
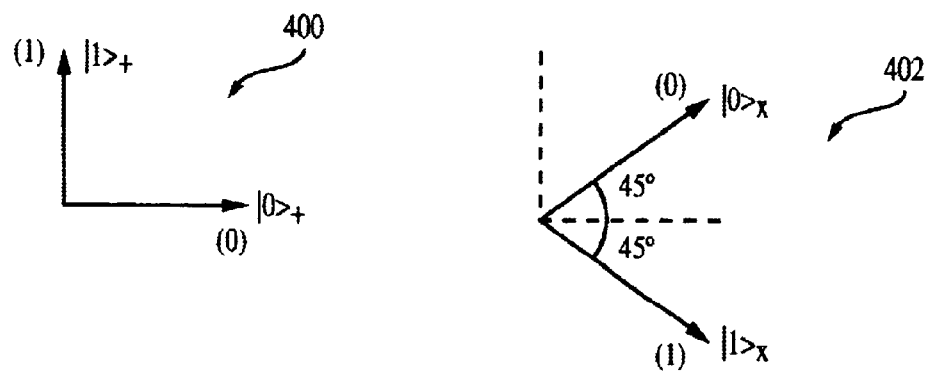
FIG. 3 illustrates the plus basis and the cross basis.
Figure 4:
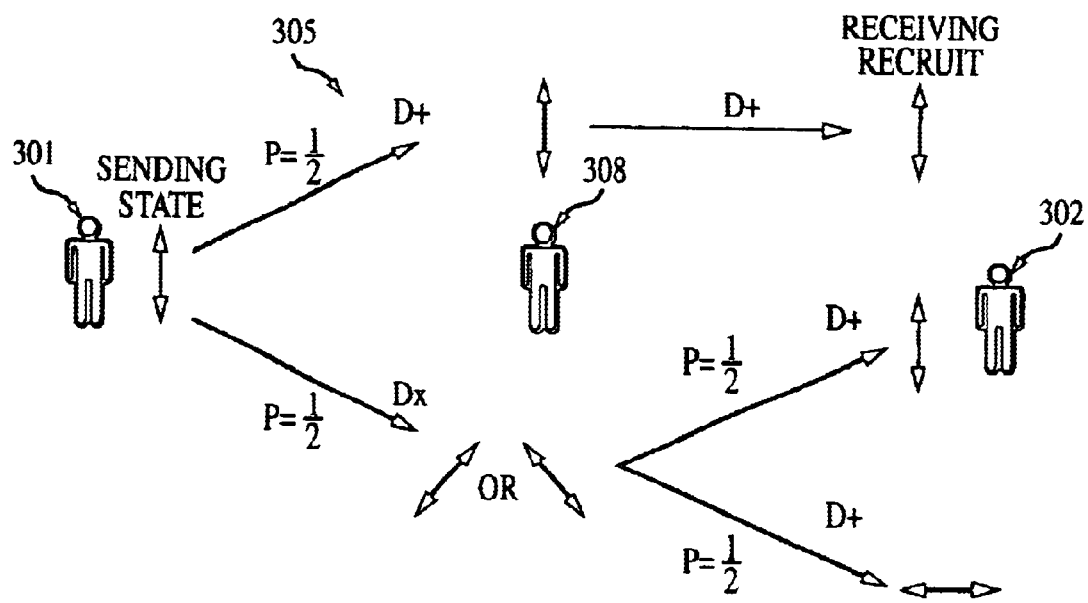
FIG. 4 illustrates the effect of the detect and resend eavesdropping in a quantum key distribution.
Figure 5:
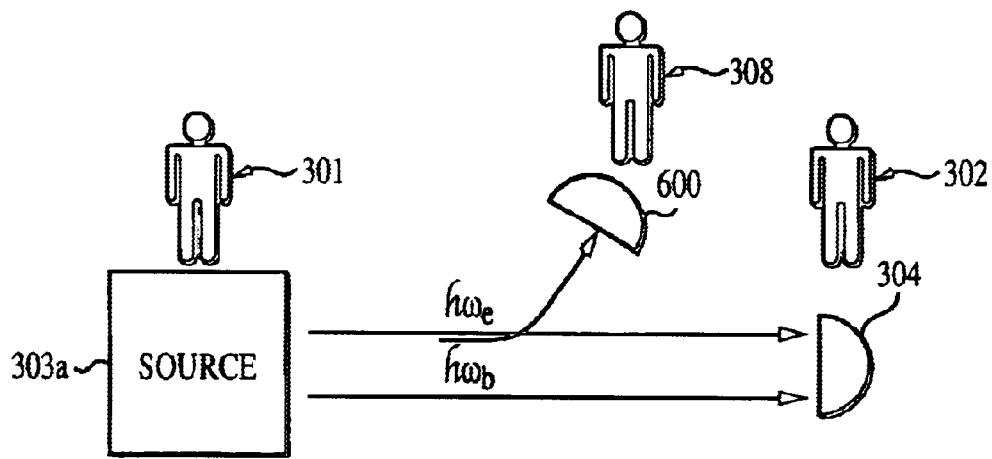
FIG. 5 illustrates an example of a defective single photon source in a quantum key distribution apparatus.

Although this invention is applicable to numerous and various types of quanta, it has been found particularly useful in the environment of photons. Therefore, without limiting the applicability of the invention to photons, the invention will be described in such environment.

The uncertainty principle forms the basis of unconditional security in quantum key distribution. Specifically, it allows eavesdroppers to be detected by exploiting the fact that any attempt to obtain information about the state of a quantum system in an unknown state will entail interacting with the system and will inevitably disturb its state. This is not guaranteed in a classical system. When applied to BB84protocol, security is guaranteed when individual photons are used as the quanta for carrying information. However, dangerous instances may occur, such as when the source 303 is defective and emits two or more photons. Such instances correspond to using a classical system (with a plurality of photons) as the information carrier in which no security guarantees can be made because part of the photons can be stolen without being detected. If security is to be guaranteed, it is thus essential to be able to detect that the information carriers are indeed single quanta or that the quantum source is not defective.

The nonlocality of quantum mechanical waves is a phenomenon that can only be achieved with a quantum system and is impossible in a classical system. This nonlocality can be formularized or expressed numerically so that by examining the results it is possible to ascertain that the carriers are indeed single quanta. If the results exhibit a correlation that can only be achieved with two or more quanta having a quantum correlation, then it is possible to obtain positive proof that this system is indeed a quantum system. The present invention uses this principle to test the reliability of a quantum key distribution apparatus and to test for the presence or absence of eavesdropping.

A Bell state consisting of two particles is perhaps the most well-known state in which two or more quanta have a quantum correlation. However, the preferred implementation of the present invention uses three particles in a GHZ state. Although a Bell state can also be used to check an apparatus by investigating the correlation of measurement results for the two particles, the results occur with non-integer probabilities and this makes it necessary to assume that the tests are performed independently each time. As mentioned in D. Mayers and A. Yao, in *Proceedings of the 39th Annual Symposium on Foundations of Computer Science*, p. 503 (1998), this assumption may not necessarily hold under circumstances such as when the system is subjected to quantum attacks by an eavesdropper. However, if a GHZ state is used, it is possible to evaluate without making any assumptions whether or not the apparatus is perfect or what degree of error rate the apparatus has if imperfect. The implementation in the example described below uses the polarization states of photons, but the present invention is not limited thereto and can work with any quantum system, such as atoms or electrons. In the preferred embodiment for the case where the quanta are photons, the photons must possess quantum states satisfying the following relationships between three bases.

A set of left-handed and right-handed circular polarization states, a set of horizontal and vertical linear polarization states, and a set of linear polarization states at ±45° to the horizontal axis are used as three two-dimensional orthonormal bases. These bases are represented as Bo={|0>o,|1>o}, B+={|0>+,|1>+} and Bx={|0>x,|1>x} and are linked by the following relationships:

$|0>+=(|0>o+|1>o)/\sqrt{2}$ $|1>+=-i(|0>o-1>o)/\sqrt{2}$ $|0>x=\{(1-i)|0>o+(1+i)|1>o\}/\sqrt{2}$ $|1>x\{(1+i)|0>o+(1-i)|1>o\}/\sqrt{2}$ Consider the situation where three particles have a quantum correlation represented by the GHZ state $(|0>o|0>o|0>o-|1>o|1>o|1>o)/\sqrt{2}$. For the sake of simplicity, the plus basis measuring device is represented as M+ and the cross basis measuring device is represented as Mx. When the combination of measuring devices used to measure the first, second and third particles is (M+, M+, M+), the parity of the measured values for these three particles will be 1 with a probability of 1, whereas with the combinations (M+, Mx, Mx), (Mx, M+, Mx) or (Mx, Mx, M+), the parity of the measured values for these three particles will be 0 with a probability of 1. Conversely, when the test is performed a sufficiently large number of times and this measurement result is completely satisfied, it follows that the system is in a perfect GHZ state immediately prior to the measurement and that the measurement is also performed perfectly. In a classical system having no quantum correlation, the parity will become random for any combination of bases and it is impossible to arrive at this result. If imperfect results are obtained in a quantum system, the error rate of the overall quantum apparatus is the probability of an unexpected parity appearing.

Exactly the same can be said for the case of the GHZ state $(|0>o|0>o|0>o+|1>o|1>o|1>o)/\sqrt{2}$, except that the abovementioned parities 0 and 1 are reversed.

A method for testing apparatus reliability and a method for key distribution based on the above mentioned circumstances will now be described with reference to FIG. 1, the apparatus being generally referred to by reference numeral 100. Tests are performed a sufficient number of times for each of the above mentioned four sets of bases, and to perform a correlation check between the three particles, the types of the two bases used by the sending party 301 and the one basis used by the receiving party 302 are arranged beforehand through a classical public channel 306.

The sending party 301 produces a set of three photons 110, 112, 114 in a GHZ state from a GHZ source 103 in base Bo, and the sending party 301 uses prearranged measurement bases to measure the first and second of these photons 110, 112 at measuring devices 107 and 108. The third photon 114 is transmitted to the receiving party 302 through a quantum channel 305. The receiving party 302 uses a prearranged measurement basis to measure the transmitted photon 114 at measurement device 304.

The parity of the measurement results for the three photons 110, 112, 114 are collated on a bitwise basis between the sending and receiving parties 301, 302, and a check is made as to whether or not the parity is correct (i.e., behaves as discussed above). After a sufficiently large number of tests, the apparatus 100 can be relied on if all the results are perfect or if the error rate is within a tolerable range. If the error rate exceeds the tolerable range, then either the apparatus 100 is unreliable or there is an eavesdropper 308.

If the apparatus 100 is found to be reliable, key distribution is performed by the following procedure. The sending party 301 produces a set of three photons 110, 112, 114 in a GHZ state by GHZ source 103 in base Bo, and the sending party 302 measures the first and second of these photons 110, 112 using bases selected from B+ and Bx at random for each bit. The measurement bases and the results are stored. The third photon 114 is transmitted to the receiving party 302 through the quantum channel 305. The receiving party 302 measures the transmitted photon 114 at measuring device 304 using a base selected from B+ and Bx at random for each bit. The measurement basis and the result are then stored.

The three bases used are collated between the sending and receiving parties 301, 302 for each bit (without telling the measurement results). Of these, about half the bits will correspond to cases where the selected bases constitute one of the abovementioned four sets of bases; these bits are kept, and the other bits are discarded. If there is no eavesdropper 308, the parity of the two resulting random number series should be as described above.

The sending party 301 and receiving party 302 extract test bits at random from the resulting random number series, and check whether or not they are correct by collating the parity of the bit values for each bit. If this test produces the correct parities for a sufficient number of bits, it can be concluded with a probability close to 1 that there is no eavesdropping activity, in which case the test bits are discarded and a shared key is produced from the remaining random series of bits. But when bits are discovered that do not match, it is concluded that there is an eavesdropper 308, and the communication session is abandoned. The session is restarted from the beginning after checking the quantum channel 305 or switching to another quantum channel 305$a$.

The above process allows a shared key to be produced between the sending and receiving parties while confirming that there is no eavesdropper.

Once the sending party 301 has measured each of the two photons 110, 112 on the sending party 301 side, this protocol becomes equivalent to the BB84 protocol in the case where it is certain that single photons are used (i.e., the source is not defective).

As described above, only three photons that are definitely in a GHZ state will pass the reliability test of the quantum key distribution apparatus 100. The reliability test will fail if the GHZ state is disturbed by factors such as eavesdroppers 308 or apparatus defects at any point during its generation, transmission or detection, and for this reason it is possible to solve the problem of being unable to confirm the security of quantum key distribution.

Thus, it is readily apparent to those skilled in the art that the quantum key distribution method and apparatus of the present invention is able to check the reliability of a quantum cryptographic apparatus 100 and whether or not there are any eavesdroppers 308, and it is thus able to confirm the security of quantum key distribution.

While there has been shown and described what is considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A method for testing the reliability of a quantum key distribution apparatus, the method comprising the steps of:

producing a set of quanta by a sender, the set of quanta comprising first, second, and third quantum, the first, second, and third quantum having a quantum correlation;

measuring the first and second quantum at the sender for one of two prearranged bases;

transmitting the third quantum to a receiver over a quantum channel;

measuring the third quantum at the receiver for one of the two prearranged bases; and exchanging information regarding the measured bases between the sender and receiver over a public channel to check for a known behavior of the quantum apparatus based upon the quantum correlation, wherein if the quantum apparatus behaves as is known or within a tolerable limit the reliability of the quantum apparatus is confirmed.

2. The method for testing the reliability of a quantum apparatus as claimed in claim 1, wherein the sender produces the set of quanta with the quantum correlation in a Greenberger-Horne-Zeilinger (GHZ) state represented as $$(|0>|0>|0>+|1>|1>|1>)/\sqrt{2}, \text{ or}$$

$$(|0>|0>|0>-|1>|1>|1>)/\sqrt{2}$$

in a two-dimensional orthonormal basis B={|0>,|1>}, wherein the first and second quantum are measured by the sender, and the third quantum is measured by the receiver using either of the following two types of basis;

a two-dimensional orthonormal basis Bb={|0>b,↑1>b) having the following relationship to basis B:

$$|0>b=(|0>+|1>)/\sqrt{2}$$

$$|1>b-i(|0>-|1>)/\sqrt{2}; \text{ or}$$

a two-dimensional orthonormal basis Bc=|0>c,|1>c} having the following relationship to basis B:

$$|0>c=\{(1-i)|0>+(1+i)|1>\}/\sqrt{2}$$

$$|1>c=\{(1+i)|0>+(1-i)|1>\}/\sqrt{2};$$

wherein the known behavior checked for is that the parity of the measured values is one or zero depending upon a combination of the bases of measuring devices used to measure the states of the first, second, and third quantum.

3. The method for testing the reliability of a quantum apparatus as claimed in claim 1, wherein the quanta are photons.

4. The method for testing the reliability of a quantum apparatus as claimed in claim 3, wherein the quantum channel is an optical fiber channel.

5. The method for testing the reliability of a quantum apparatus as claimed in claim 1, wherein a two-dimensional Hilbert space of photon polarization states is used as a signaling space.

6. The method for testing the reliability of a quantum apparatus as claimed in claim 5, wherein the prearranged bases are a set of left-handed and right-handed circular polarization states, a set of horizontal and vertical linear polarization states and a set of linear polarization states at ±45° to a horizontal axis.

7. The method for testing the reliability of a quantum apparatus as claimed in claim 1, wherein the quanta are electrons.

8. The method for testing the reliability of a quantum apparatus as claimed in claim 7, wherein a two-dimensional Hilbert space of electron spin states is used as a signaling space.

9. The method for testing the reliability of a quantum apparatus as claimed in claim 1, wherein the quanta comprise atoms.

10. The method for testing the reliability of a quantum apparatus as claimed in claim 9, wherein the quanta comprise nuclear spins.

11. A method for quantum key distribution, the method comprising the steps of:

producing a set of quanta by a sender, the set of quanta comprising first, second, and third quantum for use as carriers of key information, the first, second, and third quantum having a quantum correlation;

measuring the first and second quantum at the sender for a randomly selected basis from a group consisting of two bases;

transmitting the third quantum to a receiver over a quantum channel;

measuring the third quantum at the receiver for a randomly selected basis from a group consisting of the two bases;

exchanging information regarding the measured bases between the sender and receiver over a public channel to check for a known behavior of the quantum apparatus based upon the quantum correlation; and repeating the above steps a plurality of times thereby sharing the key as a string of bits wherein each bit of the string is distributed for each iteration where the quantum apparatus behaves as is known or within a tolerable limit, and where the bit value is determined according to a predetermined criteria based upon the randomly selected basis chosen for the first, second, and third quantum and the measurement thereof.

12. The method for quantum key distribution as claimed in claim 11, wherein the sender produces the set of quanta with the quantum correlation in a Greenberger-Horne-Zeilinger (GHZ) state represented as $(|0>|0>|0>+|1>|1>|1>)/\sqrt{2}$, or $(|0>|0>|0>-|1>|1>|1>)/\sqrt{2}$ in a two-dimensional orthonormal basis $B=\{|0>,|1>\}$, wherein the first and second quantum are measured by the sender, and the third quantum is measured by the receiver using either of the following two types of basis;

a two-dimensional orthonormal basis $Bb=\{|0>b,|1>b\}$ having the following relationship to basis B;

$|0>b=(|0>+|1>)/\sqrt{2}$ $|1>b=i(|0>-|1>)/\sqrt{2}$; or a two-dimensional orthonormal basis $Bc=\{|0>c,|1>c\}$ having the following relationship to basis B;

$|0>c=\{(1-i)|0>+(1+i)|1>\}/\sqrt{2}$ $|1>c=\{(1+i)51\ 0>+(1-i)|1>\}/\sqrt{2}$;

wherein the known behavior checked for is that the parity of the measured values is one or zero depending upon a combination of the bases of measuring devices used to measure the state of the first, second, and third quantum.

13. The method for quantum key distribution as claimed in claim 11, wherein the quanta are photons.

14. The method for quantum key distribution as claimed in claim 13, wherein the quantum channel is an optical fiber channel.

15. The method for quantum key distribution as claimed in claim 13, wherein a two-dimensional Hilbert space of photon polarization states is used as a signaling space for key information.

16. The method for quantum key distribution as claimed in claim 15, wherein the prearranged bases are a set of left-handed and right-handed circular polarization states, a set of horizontal and vertical linear polarization states and a set of linear polarization states at ±45° to a horizontal axis.

17. The method for quantum key distribution as claimed in claim 11, wherein the quanta are electrons.

18. The method for quantum key distribution as claimed in claim 17, wherein a two-dimensional Hilbert space of electron spin states is used as a signaling space for key information.

19. The method for quantum key distribution as claimed in claim 11, wherein the quanta comprise atoms.

20. The method for quantum key distribution as claimed in claim 19, wherein the quanta comprise nuclear spins.

* * * * *